United States Patent [19]

Scarnato et al.

[11] 3,770,064

[45] Nov. 6, 1973

[54] ROW CROP PULLER-SHREDDER

[75] Inventors: Thomas J. Scarnato, Barrington; James J. Dryan, Chicago; James J. Nicholson, Lockport; Craig M. Lawler, Downers Grove; Anthony J. Falanga, Lemont, all of Ill.

[73] Assignee: International Harvester Company, Chicago, Ill.

[22] Filed: June 6, 1969

[21] Appl. No.: 830,966

[52] U.S. Cl. .......................... 171/58, 47/9, 56/504
[51] Int. Cl. ............................................. F01d 25/04
[58] Field of Search .................... 171/58, 24, 42; 56/24, 121.44, 121.45, 500, 504; 47/1, 9; 111/7

[56] References Cited
UNITED STATES PATENTS

| | | | |
|---|---|---|---|
| 1,117,314 | 11/1914 | Blunck | 171/24 |
| 1,081,201 | 12/1913 | Blunck | 171/24 |
| 706,416 | 8/1902 | Hotchkiss | 171/58 |
| 2,718,109 | 9/1955 | Hintz et al. | 171/24 |
| 2,748,535 | 6/1956 | Skromme et al. | 47/9 |
| 3,010,522 | 11/1961 | Oppel | 171/58 |
| 3,295,299 | 1/1967 | Brady et al. | 56/24 |
| 3,437,152 | 4/1969 | Barrentine | 171/58 |

*Primary Examiner*—Antonio F. Guida
*Attorney*—Floyd B. Harman

[57] ABSTRACT

An agricultural implement effective to remove from the soil implanted crop residue and the like, while at the same time preparing a seed bed for optional concomitant planting operations, the implement having puller wheels that work the soil and converge and grasp the residue below the surface of the soil in uproot the same and feed it into a shredder positioned in receiving relation thereto, the shredder being operative to comminute the residue and having means to selectively collect or distribute it about the field; and a planting assemblage selectively attachable in trailing relation to the shredder and having an orientation with respect to the puller wheels to simultaneously plant a crop in the seed bed prepared by the wheels.

13 Claims, 13 Drawing Figures

PATENTED NOV 6 1973
3,770,064
SHEET 1 OF 5
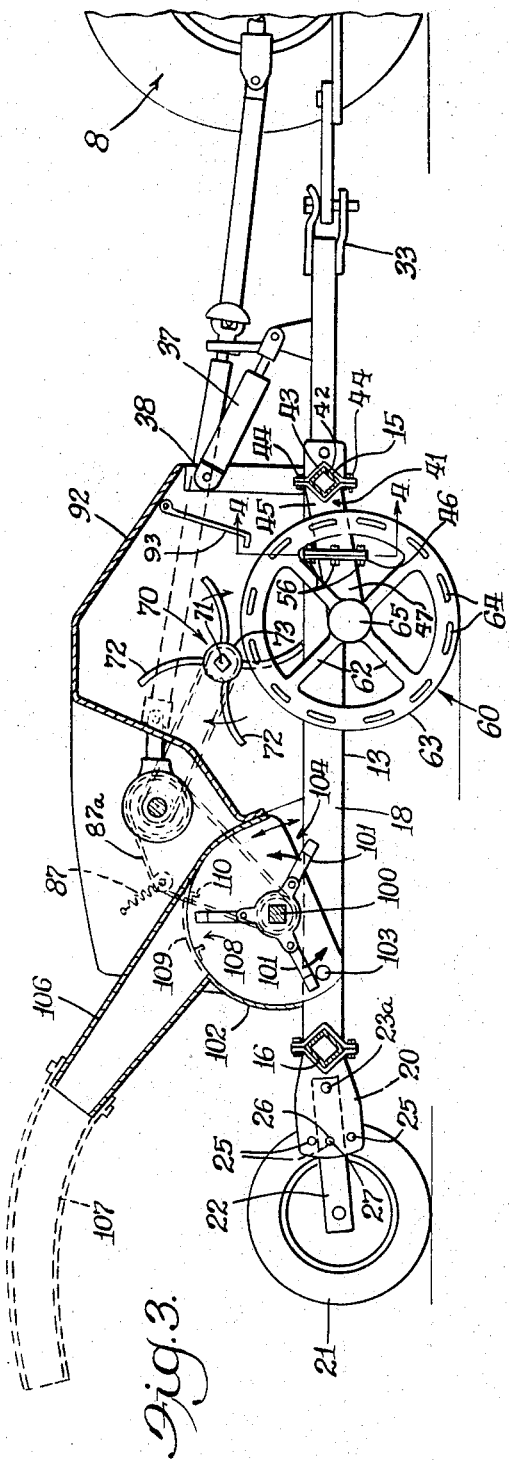
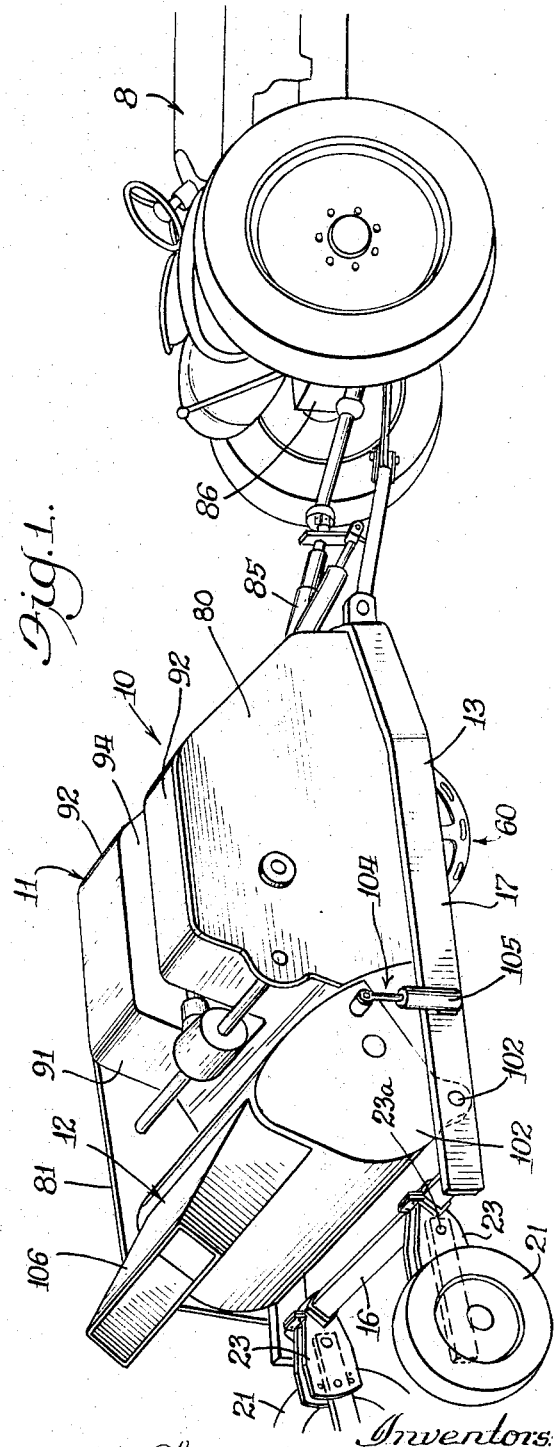
Fig.1.
Fig.3.
Inventors:
Thomas J. Scarnato,
James J. Bryan,
James J. Nicholson,
Craig M. Lawler and
Anthony J. Talgnda
By John J. Kowacek
Atty.

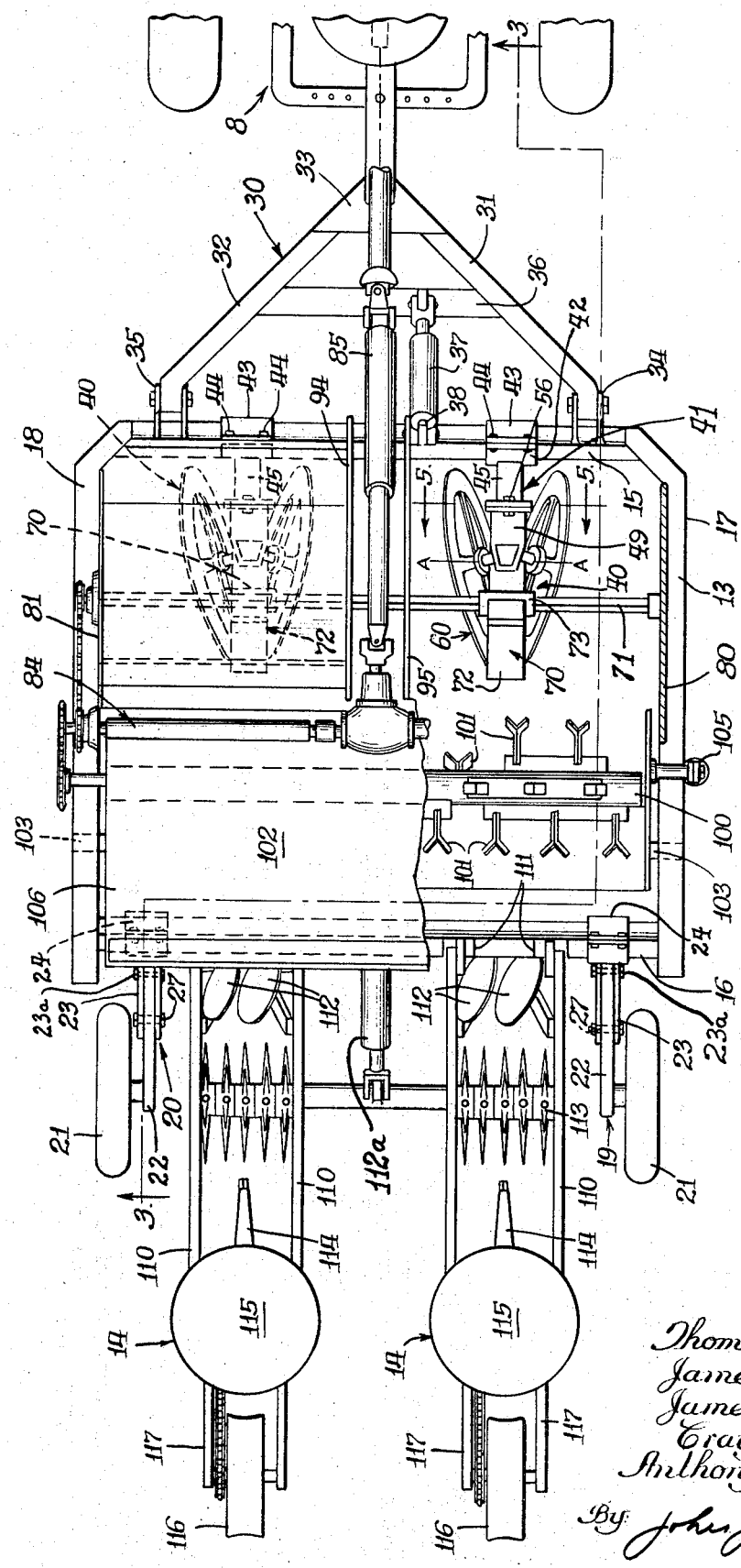

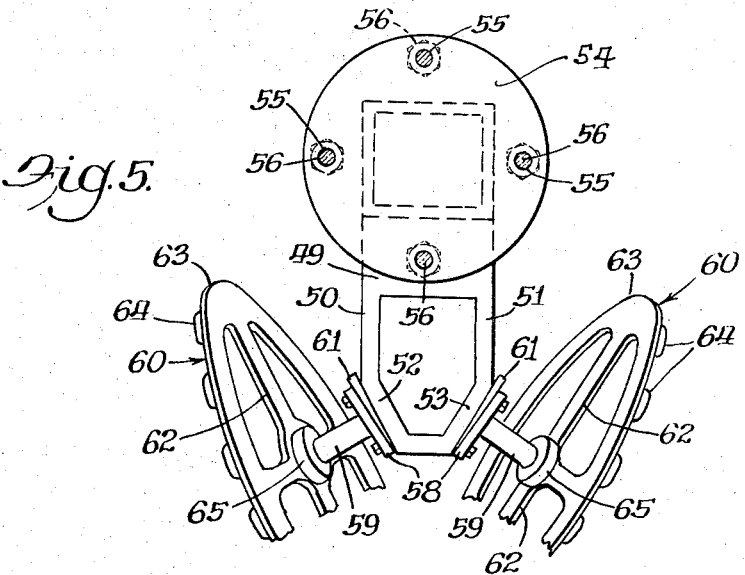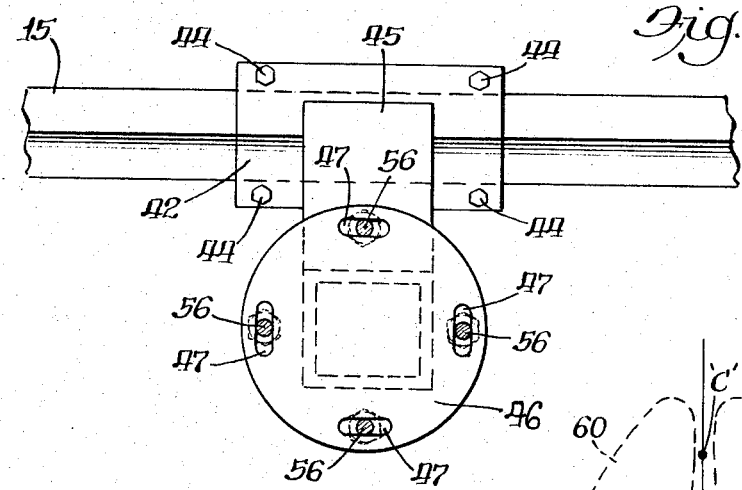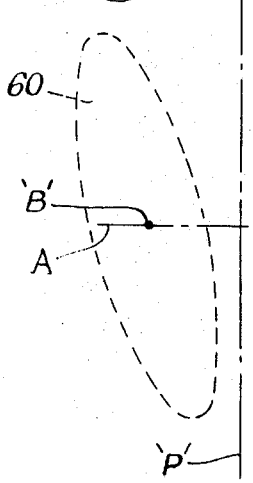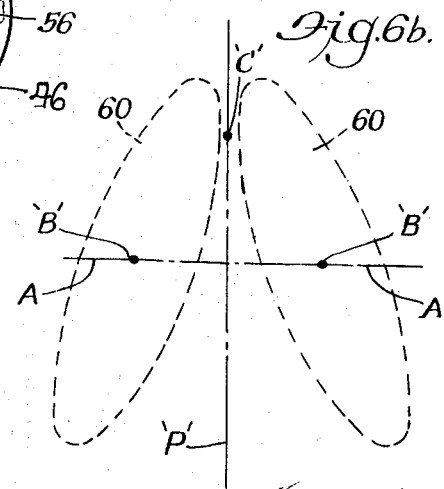

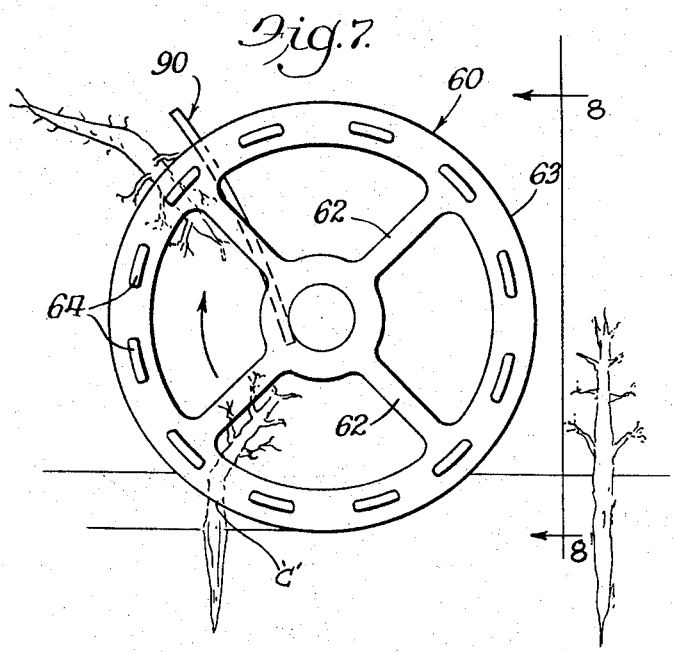
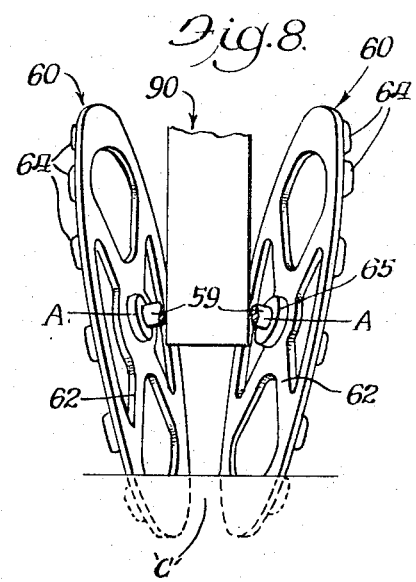
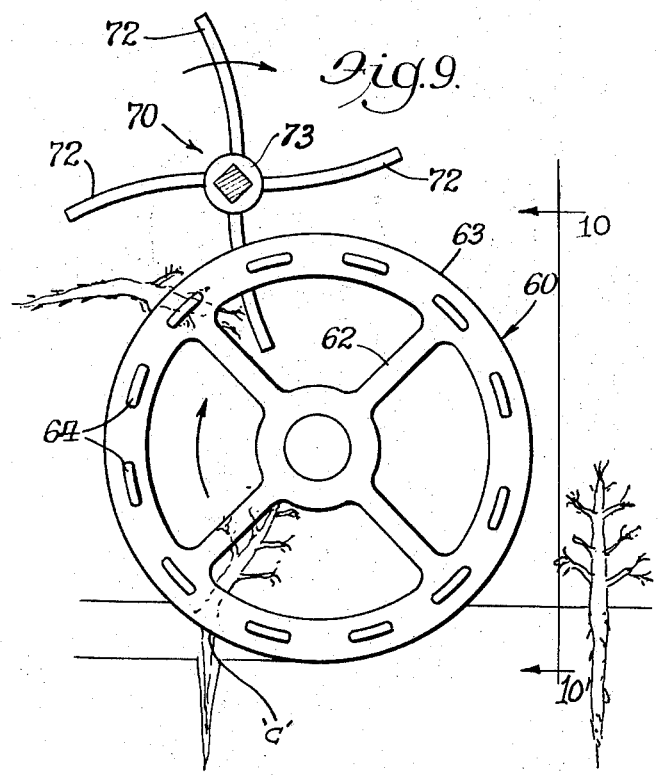
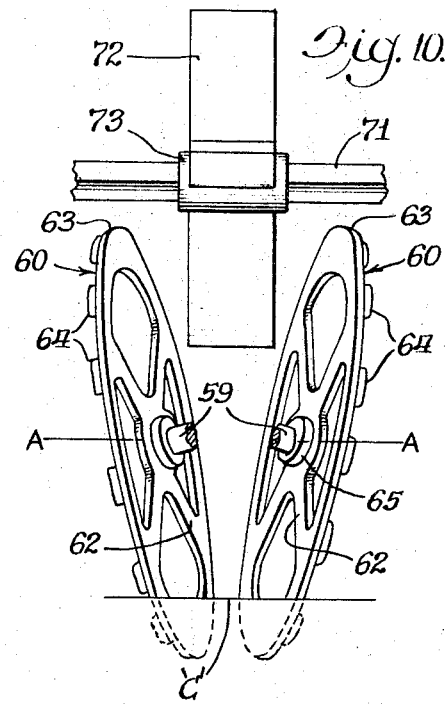

Inventors:
Thomas J. Scarnato,
James J. Bryan,
James J. Nicholson,
Craig M. Lawler and
Anthony J. Falanga By John J. Kowalik
Atty.

ROW CROP PULLER-SHREDDER

BACKGROUND OF THE INVENTION

The trend in modern farming has been to find new and efficient ways to increase productivity while reducing operational costs. The invention herein disclosed relates to an agricultural implement that effects a novel approach of clearing fields of implanted crop residue while integrating certain other operations to produce an efficient machine capable of combining heretofore singular farming operations into a single process.

The invention relates directly to the problem implanted crop residue left in a field after harvest. Such residue creates a number of problems, one obviously is that the remaining residue must be dealt with before the field can be again used for subsequent crops. However another concern involves insect control, for it has been found with certain crops, that unless such implanted residue is dealt with immediately after harvest, it will harbor destructive insects capable of destroying a subsequent similar crop.

The Pink Bollworm is an example of an insect which represents such a danger to cotton crops that there is a movement in some States to require by law in addition to shredding and buring that fields be cleared of the cotton crop residue in order to deprive the bollworm a place to harbor in an attempt to control this menace.

Heretofore burying crop residue by deep plowing has been one of the generally accepted methods of dealing with such residues. This method however requires subsequent tillage operation to place the field in a condition suitable for planting operations which is a labor consuming and expensive operation, especially where the growing season permits a second crop.

The instant invention deals with this crop residue problem in a unique and revolutionary way. First of all the implement incorporates a crop pulling section capable of uprooting the crop residue from the soil and feeding the same directly into a comminuting portion arranged in receiving relation thereto. The comminuting portion shreds the residue and then discharges it therefrom to either be collected or distributed about the field. It is contemplated that certain residues may have commercial value when comminuted and collected, thereby making this process even more profitable.

It has been found that the instant invention through its digging and pulling operation loosens the soil sufficiently to prepare a seed bed so that suitable planting devices can be attached to the puller-comminution portions; by this means a removing and processing of implanted crop residue can be accomplished simultaneously with a planting of a second crop, thereby necessitating only a single pass through a field for the entire operation. This method of farming is especially desirable where the growing season allows a second crop.

A general object of the invention is to provide a novel mobile agricultural implement which removes implanted crop residue from the soil and comminutes the same for subsequent distribution or collection.

A more specific object of the invention is to provide as part of the implement a pulling mechanism that grasps the crop below the surface of the soil to remove it therefrom while simultaneously preparing that portion of the soil as a seed bed.

Another object of the invention is to provide as part of the implement a shredding mechanism positioned in a receiving relation to said pulling mechanism to comminute crop residue received therefrom.

A more specific object of the foregoing is to provide said shredding mechanism with means for selectively scattering or collecting comminuted residue discharged therefrom.

Still another object of the invention is to provide doffer means cooperating with said pulling mechanism to direct extracted crop residue into the shredding mechanism.

A still further object of the invention is to provide means for selectively adjusting the penetration and attitude of the pulling mechanism for a particular crop and soil.

Another object of the invention is to provide means for selectively positioning the shredding mechanism with respect to the pulling mechanism to adapt the implement to various crops and conditions.

A further object of the invention is to provide a planter which is optionally attachable in orientation to the pulling mechanisms to simultaneously plant a crop in the seed bed prepared by that mechanism.

These and other objects will become apparent from the following specifications and drawings.

BRIEF DESCRIPTION OF THE DRAWING

FIG. 1 is a perspective view of the puller-shredder implement;

FIG. 2 is a plan view of a first embodiment of the invention with portions cut away to show internal parts thereof and showing a planter attached thereto;

FIG. 3 is an elevational view taken substantially at line 3—3 of FIG. 2;

FIG. 4 is a fragmentary elevational view taken substantially at line 4—4 of FIG. 3;

FIG. 5 is a fragmentary elevational view taken substantially at line 5—5 of FIG. 2;

FIG. 6a is a diagrammatic elevational view of the puller wheels having a vertical orientation with respect to the ground;

FIG. 6b is a diagrammatic plan view of the FIG. 6a;

FIG. 7 is a fragmentary elevational view of a set of puller wheels and a static doffer in relation thereto;

FIG. 8 is a view of the wheels taken substantially at line 8—8 of FIG. 7;

FIG. 9 is a fragmentary elevational view of a set of puller wheels and an active doffer in relation thereto;

FIG. 10 is a view of the wheels taken substantially at line 10—10 of FIG. 9;

DESCRIPTION OF THE PREFERRED EMBODIMENT

Figure 11:
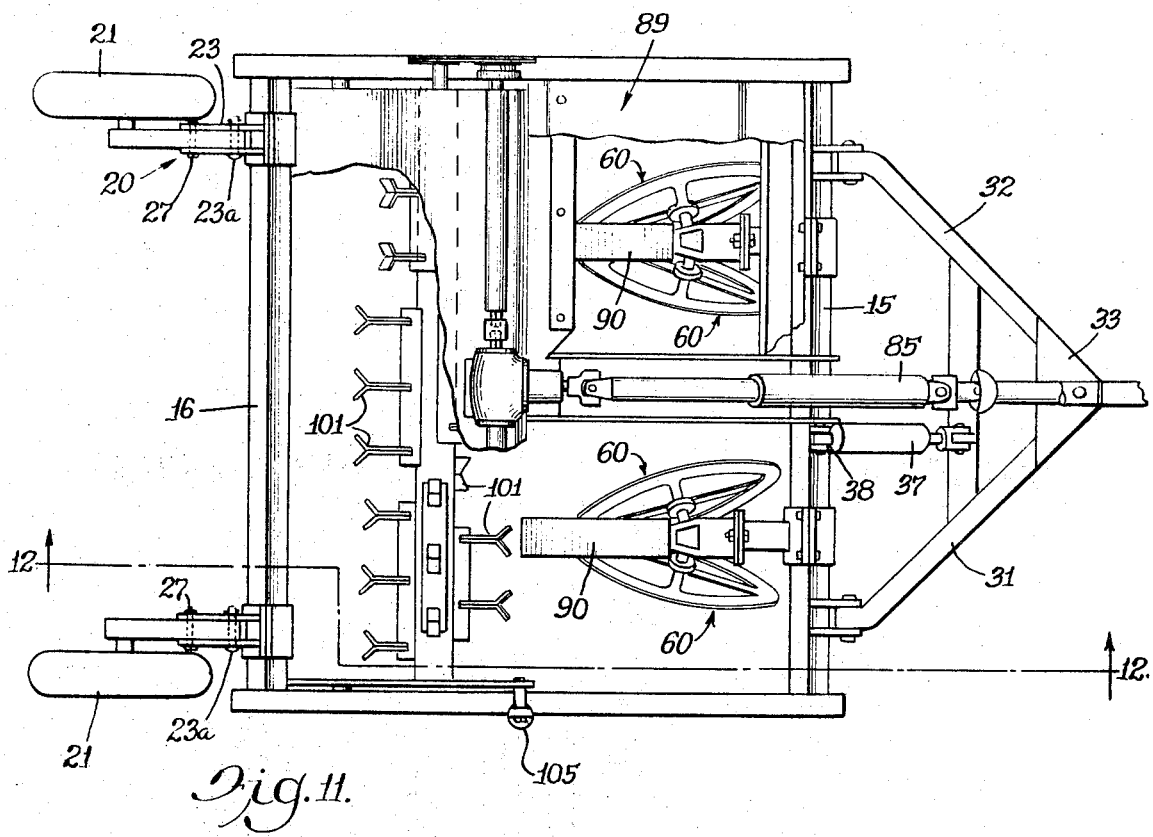
FIG. 11 is a plan view of a second embodiment of the invention featuring a static doffer.

Referring in detail to the accompanying drawings, attention is directed to FIG. 1 showing the agricultural implement, generally designated 10, and embodying the novel features hereinafter described.

The implement in its basic form comprises crop pulling and comminuting portions generally designated 11 and 12, respectively, carried by a mobile main frame 13. In the first embodiment shown in FIG. 2 a planter designated 14 is coupled to the main frame in trailing relation thereto for use where a simultaneous planting of a crop is desired.

Describing the first embodiment of the invention as best seen in FIG. 2, the main frame 13 comprises quadrilateral shaped front and rear transverse beams 15 and 16, respectively, and laterally spaced side members 17 and 18 connected therebetween. The rear of the main frame 13 is carried by ground engaging carriages designated 19 and 20 secured to the rear transverse beam 16. Each carriage includes a wheel 21 journalled on a longitudinal member 22 which is pivotally connected by pin 23a to a support bracket 23. The support bracket 23 cooperates with a clamp bracket 24 for mounting the carriages (19, 20) to the rear transverse beam 16. Both brackets 123, 24) are shaped to match the shape of the rear beam 16. Such a mounting arrangement allows each carriage to be selectively positioned and secured along the extent of beam 16 to match the row spacings of the crops. It is also shown (FIG. 3) that the support bracket 13 has a plurality of holes 25 wherein each hole is disposed to selectively register with a similar hole 26 in the pivotal member 22 at various positions of that member as it pivoted about pin 23a. When one of the holes 25 and hole 26 are aligned a pin 27 or the like is secured therethrough to provide a simple method for selectively adjusting height of the rear portion of the main frame 13 above the ground.

The front transverse beam 15 is attached to a tractor 8 by a hitch generally designated 30. The hitch comprises an A frame having members 31 and 32 extending forwardly from the front portion of the main frame to a tractor connecting tongue member 33. The rearward portion of the frame has a pivotal connection comprising pairs of laterally spaced lugs 34 and 35 secured to the front transverse beam 15. The A frame includes a stiffening cross member 36 which also serves as a reaction anchor for one end of a hydraulically operated ram 37 attached thereto. The other end of the ram is pivotally connected to an upwardly extending moment arm 38 which is rigidly affixed to the front transverse beam 15. As the ram 37 is extended and retracted it acts to respectively lift and lower the forward portion of the main frame 13.

Located within the forward part of the main frame is the croping pulling portion 11 comprising a pair of crop pulling devices generally designated 40. It should be understood that each of the pulling devices are essentially identical and operate on individual crop rows independent of each other, and that the inventive concept of the implement is not in substance involved with the number of pulling devices used in a particular implement.

As seen in FIGS. 2 and 3 each pulling device 40 comprises a puller support assembly generally designated 41 having an upper support clamp section 42 shaped to complementarily fit against the front transverse beam 15. A complementary clamp 43 also shaped to match the contour of the front beam 15, is disposed to cooperate with the upper clamp section 42 to secure the puller assembly 40 to the transverse beam. This is accomplished by means of suitable bolts 44 extending through the clamp portions 42 and 43 to thus draw and secure them about the front beam. It should be noticed that each pulling device can be selectively positioned along the front beam 15 to match row crop spacings merely by loosening the bolts 44 and sliding the entire pulling device 40 along the beam to a desired position and then be resecured at that position. As best seen in FIG. 4 the support clamp 43 is welded to a longitudinal member 45 which extends downwardly and rearwardly of the front beam to a circular base plate 46 welded thereto and having a plurality of slots 47 about its perimeter on which a rearwardly extending wheel rear support member 49 is mounted by means of a circular plate 54. As shown in FIG. 5, this support member 49 has a generally rectangular shape with parallel side members 50, 51 having rearwardly converging segments 52, 53. At the forward end of the rear support member 49 is welded the circular plate 54 which is similar to the base plate 46. The plate 54 has holes 55 therethrough disposed to register with the slots 47 of base plate 46 wherein both plates receive bolts 56 therethrough for adjustably securing the longitudinal support members (45, 49) to each other. This connection allows the rear support member 49 to be clamped in a position with its side walls 50, 51 either vertically disposed or in a plurality of other positions thus providing means for canting this entire rear support member within a range determined by the slots 47.

Bolted to each segment 52, 53 of the rear support member 49 is a standard 58 having an integral spindle 59 extending angularly in a downward and rearward direction. On each spindle is journalled a puller wheel 60 thus producing a pair of cooperating rotatable puller wheels having a cant disposition with respect to each other. Wedges 61 are selectively positioned between the hub 58 and the respective converging segment (52,53) on which it is mounted to provide an adjustment for selecting the degree of cant and convergence of the puller wheels 60 and longitudinal position of the location of maximum convergence 'C' of the wheels.

Normally each standard 58 is secured to the rear support member 49 in such a manner that the wheels 60 are substantially symmetrically disposed relative to each other and to a hypothetical plane 'P' interposed between the wheels as shown diagrammatically in FIGS. 6a and 6b. Each pulling assembly 40 is mounted on the main frame so that this plane 'P' is substantially aligned with the direction of travel resulting in the wheels being in a general symmetrical disposition relative to the row of crop residue during normal operations. With this arrangement each pair of cooperating pulling wheels 60 will have their centers 'B' aligned in a direction substantially normal to the direction of travel and said hypothetical plane is indicated by a center line A—A pass through their centers 'B'.

The pulling wheels 60 have a skeletal make up to allow soil to freely pass therethrough. Each puller wheel 60 comprises a hub 65 with radial spokes 62 extending therefrom connecting to a rim 63. The hub 61 is journalled on its respective spindle 59 to allow the entire wheel to freely rotate about the spindle as the wheel is dragged along and through the ground. The rim 63 of each puller wheel has disposed about its outer surface protuberant lug portions 64 (see FIGS 7 and 8) integral therewith to increase the drag of the wheel through the ground to assure rotation of the wheels necessary for crop-pulling action.

The general principle of operation of the crop-pulling wheels is that the implanted crop be grasped at the location of convergence 'C' and as the puller wheels cooperatively rotate rearwardly and upwardly causing an upward force to be imparted to the grasped crop with the result that crop is extracted from the soil. The puller assembly herein described uses this general principle in a particular manner. First, the hydraulic ram 37 is operated to position the front portion of the main frame at an elevation which will position the vertical attitude of the puller assembly 40 such that the puller wheels penetrate the ground sufficiently to assure that the pair of pulling wheels cooperate to act directly on the root of the implanted crop residue. Prior to this the wedges 61 are adjusted to select the amount of convergence of the wheels with respect to the implanted crop being extracted. Along with this adjustment the location of maximum convergence 'C' is positioned at a location just slightly rearward of transverse center alignment of the wheels which is heretofore indicated by the line A—A. Furthermore it has been found that with certain crops excellent pulling performance can be assured by canting the pair of pulling wheels so that the interposed plane 'P' is disposed angularly to the ground rather than having a vertical relation therewith. This adjustment is made by loosening the bolts 56 securing the slotted circular base plate 46 of the forward member 45 to circular plate 54 of the rear support member 49 and rotating that support member 54 in the slots 47 of the base plate 46 until a desired angle is obtained. When the wheel pair is canted as described, the implanted residue will be grasped angularly thus providing a more firm grasp of the wheels on the implanted crop.

As hereinbefore described each pulling device uses a pair of rotatable wheels that penetrate the ground while they simultaneously rotate and extract implanted crops as the entire device is pulled along the field in line with rows of implanted crop residue. When the pulling wheels are canted the implanted residue enters between the pulling wheels 60 and is grasped at the point of convergence, twisted slightly, and pulled laterally and upwardly and rearwardly by the rotating wheels 60 as they continue to rotate rearwardly and upwardly. Thereafter the wheels diverge thus releasing and delivering the extracted crop which is further processed by the comminution portion 12.

It can be appreciated that the entire crop pulling process hereinbefore described is also effective for loosening the soil and preparing a preliminary seed bed of adequate depth for concomitant planting operations.

To aid in the delivery of extracted crop residue into the comminution portion 12 and to keep the pulling wheels free entangled crop residue, means for doffing the extracted residue have been provided.

FIGS. 2 and 3, show the invention using an active doffer assembly generally designated 70. The doffer assembly which includes a shaft 71 is journalled in side walls 80, 81 which extend upwardly from the longitudinal side support 17, 18 respectively. The shaft 71 is drivingly connected to a power train generally designated 84 which includes an articulated and telescoping drive shaft 85 powered by a power take-off 86 of conventional design on the tracter 8 (FIG. 1). The shaft 71 is journalled between said side walls 80, 81 and is disposed substantially aligned with and slightly rearward of, the center line A—A of the puller wheels 60 (FIG. 2). Mounted on the shaft to rotate in conjunction therewith are doffer flails 72 disposed to rotate between the puller wheels as shown best in FIGS. 2 and 10. The flails are mounted on a hub 73 which is secured to the shaft in the position between the wheels. The shaft and flails are driven to rotate in the direction indicated by the arrows in FIGS. 3 and 9, so that the doffer flails contact and impel crop residue toward the comminution portion as the extracted residue is directed upward and released by the divergence of the puller wheels.

Figure 12:
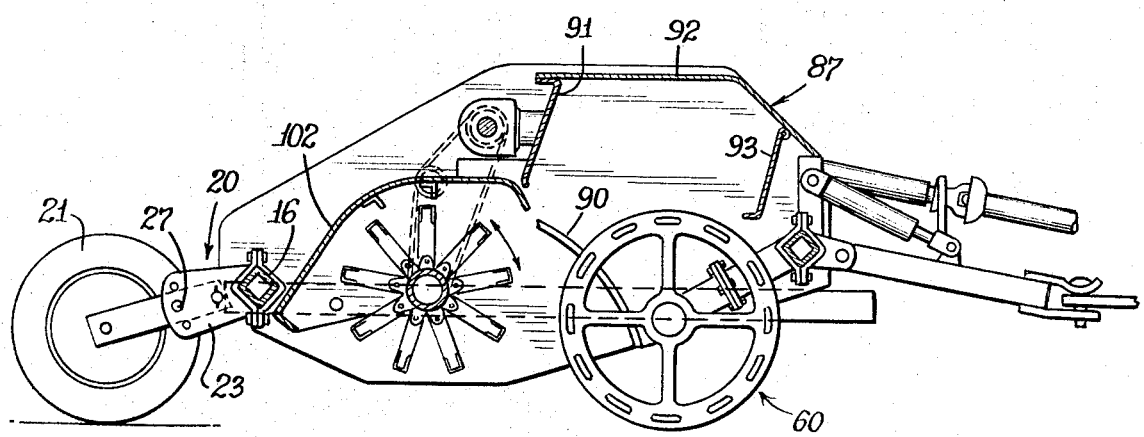
FIG. 12 is a sectional view taken substantially at line 12—13 of FIG. 11.

It is also contemplated that an inexpensive static doffer 90 shown on a modified embodiment of the implement generally designated 89 in FIGS. 7, 11 and 12 can be used under certain conditions. This doffer would comprise a heavy metal plate having a slight curvature and rigidly affixed to the rearward extent of the wheel support 49 and disposed to extend in an upward and rearward direction in relation to the comminution portion to direct residue thereinto.

The pulling assemblies are enclosed by a downwardly and rearwardly extending transverse wall 91 and top walls 92 having swingable front flaps 93 with each of the walls having connections to the side walls 80 and 81 and intermediate side walls 94 and 95.

Located just rearward of the puller wheels and in crop receiving relation thereto is the comminution portion 12. The comminution portion comprises a driven flail rotor 100 having a plurality of swingable flail knives 101 attached thereto. The rotor is jornalled in a heavy structural rotor housing 102 which is pivotally journalled on the side members 17 and 18 of the main frame 13 on stub axles 103 secured to the rotor housing 102 and located in aligned positions rearwardly of the flail rotor. The rotor housing is disposed within the main frame 13 such that the position of the flail rotor therein is substantially transverse to the direction of travel and has a crop receiving opening 104 which is in close proximity with the puller wheels and cooperating doffers. A hydraulically driven ram 105 is operatively connected between the main frame 13 and the rotor housing 102 to pivot the housing about the axles 103 to thereby and selectively position the crop receiving opening 104 of the rotor housing relative to the puller wheels and associtaed doffers. The power train 84 includes tension correcting means 87 to maintain proper tension on the drive 87a to the flail rotor 100 within the limits of travel of the rotor housing.

The flail rotor rotates in the direction as indicated by the arrows in FIG. 3 and the extracted crop residue is introduced into the forwardly disposed transverse opening 104 across the lower extent of the rotor housing. As the extracted crop residue is fed upwardly and rearwardly it is impelled or directed by the doffer into the upper portions of the opening 104 at locations where the flail knives on the rotor 100 begin on an upward and then rearward course. Since the rotor operates at very high speeds comminution begins upon contact of the residue with the flails.

The top of the rotor housing merges into a chute 106 which extends substantially across the transverse extent of the housing. It is contemplated that detachable chute extension 107 can be coupled to the chute 106 when comminuted crop residue is to be conducted away from the implement for field distribution or collection into a mobile receptacle such as a wagon. Since the lower extent of the chute 106 defines an opening 108 across the top of the rotor housing it is contemplated that a closure 109 having additional shear bars 110 can be used in lieu of the extension 107 when the crop residue is to be finely comminuted and scattered about the field from the rearward portion of the lower opening 104.

It should be appreciated that by pivotally mounting the rotor housing the attitude of the crop receiving rotor housing opening 104 and rotor 100 can be selectively positioned through operation of the hydraulic ram 105; thereby allowing the operator to position the comminution portion 12 relative to the pulling portion 11 to select an optimum feed receiving relationship therebetweeen for a particular field and crop condition.

When a new crop is to be planted simultaneously with the pulling-comminution operations the planter 14 is coupled to the rear transverse beam 16 in trailing relation to the implement. Each planter comprises a pair of parallel arcuate frame members 110 pivotally connected to hydraulic ram 112a and respective clamping brackets 111 cooperating therewith for adjustably clamping the planter at selected transverse positions along the rear beam 16 for operatively aligning and elevationally positioning the planter with its respective pulling assembly 40 in order that a new crop can be planted in ground broken and tilled by the crop pulling operations. Mounted between, and to the parallel, the frame members 110 of each planter is a pair of hilling discs 112, a rotary hoe 113, a furrow opener 114, a seed box 115 and a press wheel 116.

Each of the arcuate frame members 110 have an arm integral therewith which extends angularly downward and rearward of the rear transverse beam 16 on which the rotary hoe is mounted so that the hoe will substantially mix the soil as the entire apparatus is pulled by the towing vehicle.

The furrow opener 114 is coupled to and between the arcuate side members to the rear of the rotary hoe 113 and is operative for final preparation of the soil just before receiving seeds from the seed box 115 positioned on top of the furrow opener 114. The press wheel 116 is rotatably mounted to rearwardly extending arms 117 which are coupled to the furrow opener and seed box and is operative for pressing the seed deposited from the seed box into the soil.

The cooperation between each pulling device 40 and their respective doffers 70 or 90 and the comminution portion 12 enables the cotton stalks or the like to be removed from the soil, shredded and disposed of while the rotary hoe and hilling disks simultaneously prepare the soil for planting seeds deposited from the seed box. Considerable time will be saved by farmers in that heretofore they were required to first remove the stalks from the field and then go back over the field at least one more time to prepare it for planting and depositing seeds. Since cotton fields, corn fields, etc., encompass often many acres it is obvious that the time saved by the farmer in being able to traverse the field once and accomplish the same result that presently necessitates traversing the field at least twice will result in a considerable saving in expenses, increased efficiency and profit margins.

It is believed that the invention has been described in sufficient detail so as to enable the skilled artisan to understand and practice the same. Variations in size, proportion, and arrangement of parts thereof may be made without departing from the spirit and scope of the invention.

What is claimed is:

1. An agricultural implement adapted to travel through a field in a predetermined direction for removing implanted crop residue from the soil and processing the same comprising: a mobile frame, crop pulling means comprising a pair of rotatable members mounted on said frame being cooperatively disposed to effect a gripping action on the root portion of said residue below the surface of the soil to draw portions thereof below said members from the ground, comminution means disposed to directly receive and comminute the extracted crop from said pulling means, doffer means disposed in cooperative relation to both said pulling means and comminution means to transfer the extracted crop from said pulling means to said comminution means, said pulling means comprising a pair of puller wheels, means for adjustably coupling said wheels to said frame, each of said wheels being disposed in a symmetrical relation to the other into an interposed plane having an orientation substantially aligned with said direction of travel, said pair of wheels being operative to cooperatively rotate downwardly to plow up the soil to prepare a seed bed while said wheels convergingly grasp plant stalks at their roots and extract them and to rotate divergingly upward to release the stalks, said comminution means comprising a housing pivotally coupled to said frame rearward of said pulling means, a driven flail rotor mounted within said housing and disposed substantially transverse to the direction of travel, said housing having an extent enclosing upper and rearward portions of said rotor, said housing having an open forward portion adjacent said puller wheels and disposed in receiving relation thereto, and means for pivoting said housing on said frame to selectively adjust the attitude of said open forward portion with respect to said puller wheels to select optimum receipt of crop residue.

2. The invention according to claim 1 and said extent of the housing having a discharge opening disposed over said rotor, a chute communicating with said discharge opening for conducting comminuted crop residue from said implement, and means for selectively closing said discharge opening to divert discharge of the comminuted crop therefrom.

3. An agricultural apparatus for removing plant stalks from the soil and processing the same comprising:
   a mobile frame;
   a pair of puller wheels coupled to said frame, said puller wheels converging and cooperatively rotating downwardly to plow up the soil to prepare a seeding bed and simultaneously grasping plant stalks at their roots beneath the soil and extracting them and diverging as they rotate upwardly to release the stalks;
   doffer means coupled to the frame between said puller wheels for discharging the released stalks therefrom;
   a chopper coupled to said frame having a crop receiving opening in receiving relationship to said doffer means for receiving the stalks from the puller wheels and shredding the stalks conveyed thereto by said doffer means; and
   soil preparing and seed planting means coupled to said frame for simultaneously preparing the soil for planting and depositing the seeds in said plowed seeding bed.

4. An agricultural apparatus as defined in claim 3 wherein each wheel is of skeletal construction and means for adjustably mounting the wheels from the frame, and said means adapted to mutually adjust said wheels relative to each other and to the planting means and to the shredder.

5. An agricultural apparatus as defined in claim 4 wherein said doffer comprises:
 a shaft rotatably mounted on the frame,
 a plurality of fingers on the shaft, said fingers sweeping between the wheels and paddling the stalks therefrom toward the crop receiving opening of said chopper.

6. An agricultural apparatus as defined in claim 3 wherein said chopper and said crop receiving opening is aligned with the discharge of stalks from said puller wheels, said chopper having a rotary flail assembly in the housing rotatable on an axis transverse to the delivery path of residue from said puller wheels and having a receiving side substantially coextensive with said opening facing said puller wheels, and at said receiving side sweeping upwardly in the direction of presentation of the material from the puller wheels.

7. The invention according to claim 6 and said doffer being rotatable on an axis transverse to the movement of the stalks by the puller wheels and having a sweep contra said movement of said stalks for propelling the stalks being directed upwardly by the puller wheels into said inlet opening.

8. An agricultural apparatus as defined in claim 3 wherein said means for planting the seed comprises:
 a furrow opener operative in the seed bed to open a furrow;
 a seed box coupled to said furrow opener having means for depositing seeds into the furrow; and
 means including a press wheel for establishing the deposited seed into the soil.

9. An agricultural apparatus for removing crop stalks including the roots from the soil, comprising:
 a mobile frame;
 plurality pairs of adjustable puller wheels adjustably coupled to said frame converging as they rotate downwardly and rearwardly seizing the stalk and its roots beneath the ground and diverging as they rotate upwardly and forwardly to release the stalks and operative to plow a respective plurality of planting strips on the process of removing the stalks:
 a doffer coupled to said frame and positioned between each of said pairs of pulling wheels;
 a rotary chopper carried by said frame behind said doffer to receive the stalks therefrom and having means for dispersing the shredded stalks with respect to said planting strips;
 supports coupled to the frame;
 soil preparing means carried by each support; and
 planting means carried by the supports behind said soil preparing means; and adjustably aligned therewith in respective planting strips for preparing the same and planting seeds therein.

10. An agricultural apparatus as defined in claim 9 wherein said doffer further comprises:
 a fingered rotatable assembly interposed between and coupled to the frame for forcibly flipping the stalks from out of each of said pairs of puller wheels at the areas of their release of the stalks into said chopper.

11. An agricultural apparatus as defined in claim 9 wherein each of said doffers comprises:
 a static element interposed between each pair of wheels and presenting an upwardly rearwardly sloping surface wedging the stalks rearwardly into the chopper.

12. An agricultural apparatus as defined in claim 9 wherein said soil preparing means comprises:
 rotary hoe means rotatably mounted on each of said supports.

13. An agricultural apparatus as defined in claim 12 wherein said planting means comprises:
 a furrow opener behind each rotary hoe;
 a seed box coupled to said furrow opener having means for depositing the seeds into the soil; and
 a press wheel for pressing the deposited seeds firmly into the soil.

* * * * *